(12) United States Patent
Galbreath-O'Leary et al.

(10) Patent No.: US 11,097,229 B2
(45) Date of Patent: Aug. 24, 2021

(54) DUAL-ACTION WATER AERATOR

(71) Applicant: Triplepoint Environmental LLC, Oak Park, IL (US)

(72) Inventors: Braden J. Galbreath-O'Leary, Oak Park, IL (US); Michael C. Wever, Dothan, AL (US); Patrick D. Hill, Forest Park, IL (US); Jonathan Wever, Dothan, AL (US)

(73) Assignee: Triplepoint Environmental LLC, Oak Park, IL (US)

( * ) Notice: Subject to any disclaimer, the term of this patent is extended or adjusted under 35 U.S.C. 154(b) by 117 days.

(21) Appl. No.: 16/598,842

(22) Filed: Oct. 10, 2019

(65) Prior Publication Data

US 2020/0114319 A1 Apr. 16, 2020

Related U.S. Application Data

(60) Provisional application No. 62/745,310, filed on Oct. 13, 2018.

(51) Int. Cl.
*B01F 3/04* (2006.01)
*C02F 1/74* (2006.01)

(52) U.S. Cl.
CPC ........ *B01F 3/04262* (2013.01); *B01F 3/0412* (2013.01); *B01F 3/04255* (2013.01);
(Continued)

(58) Field of Classification Search
CPC .......................... Y02W 10/10; B01F 3/04517; B01F 3/04269; B01F 3/04262; B01F 3/04255;
(Continued)

(56) References Cited

U.S. PATENT DOCUMENTS 4,229,302 A * 10/1980 Molvar ...................... C02F 7/00
 210/220
4,690,756 A * 9/1987 Van Ry ................ B03D 1/1462
 210/221.2
(Continued)

FOREIGN PATENT DOCUMENTS

WO 2016003926 A1 1/2016
WO WO-2016003926 A1 * 1/2016 ................ C02F 1/74

OTHER PUBLICATIONS

Alkhalidi, et al., "Bubble Deflector to Enhance Fine Bubble Aeration for Wastewater Treatment in Space Usage," Proceedings of the 50th AIAA Aerospace Sciences Meeting, Jan. 2012, Nashville, Tennessee, p. 1-4, American Institute of Aeronautics and Astronautics, Inc.

(Continued)

*Primary Examiner* — Stephen Hobson
(74) *Attorney, Agent, or Firm* — Potomac Law Group, PLLC; Kenneth Fagin

(57) ABSTRACT

A dual-action water aerator includes structure that generates fine, fizz-type bubbles and structure that generates larger, more roiling bubbles that cause circulation within a body of water in which the aerator is submerged. The disclosed embodiments include a ring-shaped hub with a central aperture, with a central tube extending axially from the aperture. A number of fine-bubble-producing members extend outwardly from the hub and may be attached to the hub using a twist-lock connection designed to facilitate rapid assembly and deployment of the aerator. An internal air chase extends circumferentially around the aperture. A portion of air supplied to the air chase flows into the fine-bubble-producing members and fizzes out through the members, and another portion of air that is supplied to the air chase flows into the central tube and bubbles up out of the (Continued)

tube in a roiling manner to cause circulation in the body of water.

17 Claims, 15 Drawing Sheets

(52) U.S. Cl.
CPC ...... *C02F 1/74* (2013.01); *B01F 2003/04319* (2013.01); *B01F 2003/04361* (2013.01); *B01F 2215/0052* (2013.01); *C02F 2203/006* (2013.01)

(58) Field of Classification Search
CPC ............ B01F 3/0412; B01F 2215/0052; B01F 2003/04319; B01F 2003/04361; C02F 3/201; C02F 1/74; C02F 2203/006
See application file for complete search history.

(56) References Cited

U.S. PATENT DOCUMENTS

| | | | |
|---|---|---|---|
| 5,256,309 A * | 10/1993 | Makino | B01F 3/04517 210/721 |
| 6,344,144 B1 | 2/2002 | Long et al. | |
| 8,226,292 B1 * | 7/2012 | Walter | B01F 13/0049 366/262 |
| 8,500,107 B2 * | 8/2013 | Magen | B01F 13/0049 261/120 |
| 8,833,743 B2 * | 9/2014 | Ko | C02F 3/201 261/121.1 |
| 9,586,184 B2 * | 3/2017 | Bleth | C02F 7/00 |
| 9,809,962 B1 * | 11/2017 | Gehring | B60R 15/00 |
| 9,957,176 B2 * | 5/2018 | Hill | C02F 3/302 |
| 10,022,688 B2 * | 7/2018 | Keeton, Jr. | B01F 15/00558 |
| 2010/0181263 A1 * | 7/2010 | Buch | C02F 3/1284 210/758 |
| 2012/0234754 A1 | 9/2012 | Yatsugi et al. | |
| 2012/0305495 A1 * | 12/2012 | Siami | C02F 3/223 210/748.02 |
| 2015/0246835 A1 * | 9/2015 | Ko | B01F 3/04262 210/151 |
| 2018/0127292 A1 | 5/2018 | Bettle et al. | |

OTHER PUBLICATIONS

Rosso, et al., "Aeration of large-scale municipal wastewater treatment plants: states of the art," Water Science & Technology—WST, 2008, vol. 57(7), p. 973-978, IWA Publishing, London, United Kingdom.

* cited by examiner

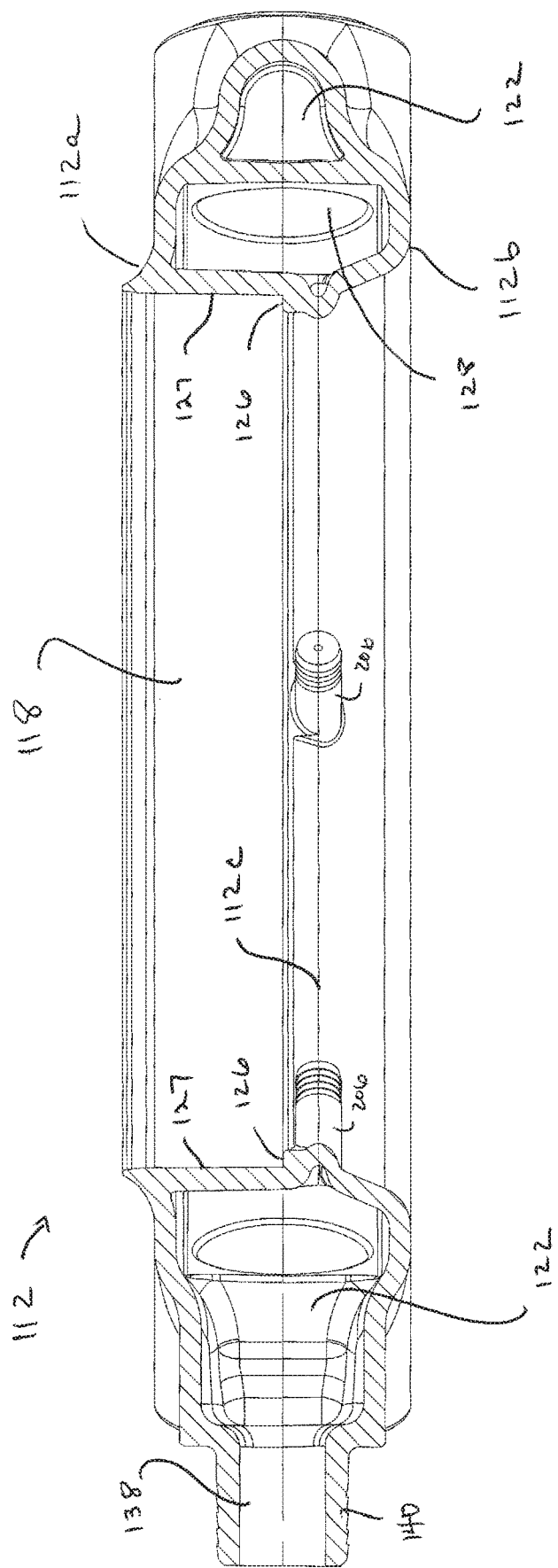

DUAL-ACTION WATER AERATOR

CROSS-REFERENCE TO RELATED APPLICATIONS

This application is based on and claims the priority benefit of provisional U.S. application 62/745,310 filed Oct. 13, 2018, the contents of which are incorporated by reference.

BACKGROUND OF THE INVENTION

In the treatment of wastewater (e.g., sewage), it is common to use aerators to increase oxygenation of the water, to "feed" aerobic, waste-consuming or waste-converting bacteria and otherwise to aid in the breakdown of organic matter. Certain known aerators used in this context are configured to produce two types of bubbles: 1) fine (e.g., fizz-type) bubbles that are produced in massive quantities, with massive total surface area to provide the majority of oxygenation obtained with the aerator; and 2) larger, more "roiling" bubbles that cause water to circulate within the treatment facility and create mixing turbulence as the bubbles are injected into and rise within the water column. Given the fundamentally different configurations of the portions of the aerator that produce these different types of bubbles, the aerators tend not to be compact and their production/assembly is not as easy/efficient as might be desired.

SUMMARY OF THE INVENTION

A dual-action water aerator includes structure that generates fine (e.g., fizz-type) bubbles and structure that generates larger, more roiling bubbles that cause circulation and sludge-mixing turbulence within a body of water in which the aerator is submerged. The disclosed embodiment includes a ring-shaped hub with a central aperture, with a central tube extending axially from the aperture. A number of fine-bubble-producing members extend outwardly from the hub. An internal air chase extends circumferentially around the aperture. A portion of air supplied to the air chase flows into the fine-bubble-producing members and fizzes out through the members, and another portion of air that is supplied to the air chase flows into the central tube and bubbles up out of the tube in a roiling manner to cause circulation and mixing in the body of water.

In one aspect of the invention, the aerator includes a ring-shaped hub with a central aperture and an internal air chase that extends circumferentially around the aperture. A number of discrete fine-bubble-producing members extend outwardly from a radially outer surface of the hub and are in fluid communication with the air chase so as to receive from the air chase air to be released from the fine-bubble-producing members in a fizzing manner. Additionally, a central tube extends axially from the central aperture. An air inlet is arranged to provide air to the air chase, with the air chase distributing the air to both the fine-bubble-producing members and the central tube.

In one possible embodiment of the aerator, the air chase may be formed as a groove extending circumferentially along a wall of the central aperture, and the central tube may be positioned within the aperture such that a radially outer, external surface of the central tube essentially closes off the groove while still allowing air to pass from the air chase into the central tube. For example, one or more U-shaped air conduits may pass under a lower end of the central tube to deliver air from the air chase into the central tube. Alternatively, holes may be formed in the wall of the central tube such that air may be injected more directly into the central tube; but aside from such air injection holes, the central tube closes off the air chase. It is to that extent that the central tube may be said to essentially close off the groove.

In another possible embodiment, the air chase may be completely embedded within the ring-shaped hub, in which case the central tube does not form a wall of the air chase. Such an embodiment may be realized by forming the ring-shaped hub from a pair of halves that have been molded and then joined together to form the complete hub.

In a preferred embodiment, the fine-bubble-producing members are attached to the hub by means of a twist-lock connection, e.g., which allows the fine-bubble-producing members to be secured to the hub with a non-threaded, approximately quarter turn. Because a twist-lock connection is non-threaded, it helps avoid installation errors due to misalignment of threads (i.e., cross-threading), over-torqueing, under-torqueing, etc. It also provides a clear stop or limit to the twisting motion, thereby helping to assure proper orientation of the fine-bubble-producing members as well as ensuring a secure seal between the fine-bubble-producing members and the hub. Thus, the twist-lock connection facilitates faster, easier, and more accurate assembly of the aerator.

The ring shape of the hub—and the associated radially extending arrangement of the fine-bubble-producing members—helps to distribute the supply of air uniformly, which minimizes bubbles coalescing that otherwise reduces oxygen transfer to the water. Furthermore, the air chase configuration reduces buoyancy of the unit by minimizing the volume of the air passages, thereby reducing the amount of weight required in the base member to keep the unit submerged.

Moreover, with the disclosed configuration, a supply of hubs could be packaged relatively compactly, given their flat shape, as is the case for the fine-bubble-producing members and the bases. The components could then be shipped to a treatment location, and the central tubes procured locally by purchasing and cutting to length standard PVC pipe, which is readily available. The central tubes would then be inserted into the hubs locally to complete assembly of the aerator.

In another aspect, the invention features fine-bubble-producing members that are configured to be connected to a source of air via a non-threaded, approximately quarter turn, twist-lock connection. This feature allows for a quick and easy connection to the central hub thereby saving time and ensuring that an airtight seal exists. A fine-bubble-producing member according to this aspect of the invention includes a tubular core; a perforated elastomeric membrane surrounding the core along the length thereof and secured to the core at both ends thereof; and a twist-lock fitting disposed at one end of the tubular core. The twist-lock fitting has an internal air passageway terminating at one or more openings positioned to deliver air to a region between a wall of the tubular core and the perforated elastomeric membrane.

In one embodiment, the fine-bubble-producing member has two or more locking projections extending from the twist-lock fitting, and the locking projections enter into locking slots formed along sidewalls of a port into which the twist-lock fitting fits. In an alternate embodiment, the locking projections extend from the sidewalls of a port into which the twist-lock fitting fits, and locking slots are formed on the twist-lock fitting.

BRIEF DESCRIPTION OF THE DRAWINGS

The advantages and novel features of the invention will become apparent from the following description of the invention in conjunction with the drawings, in which:

FIG. 11A is a section view of the aerator hub used in the aerator illustrated in FIGS. 8 and 9, taken along the lines 11A-11A in FIG. 11B and illustrating the aerator hub in elevation.

EXEMPLARY EMBODIMENTS OF THE INVENTION

Figure 1:
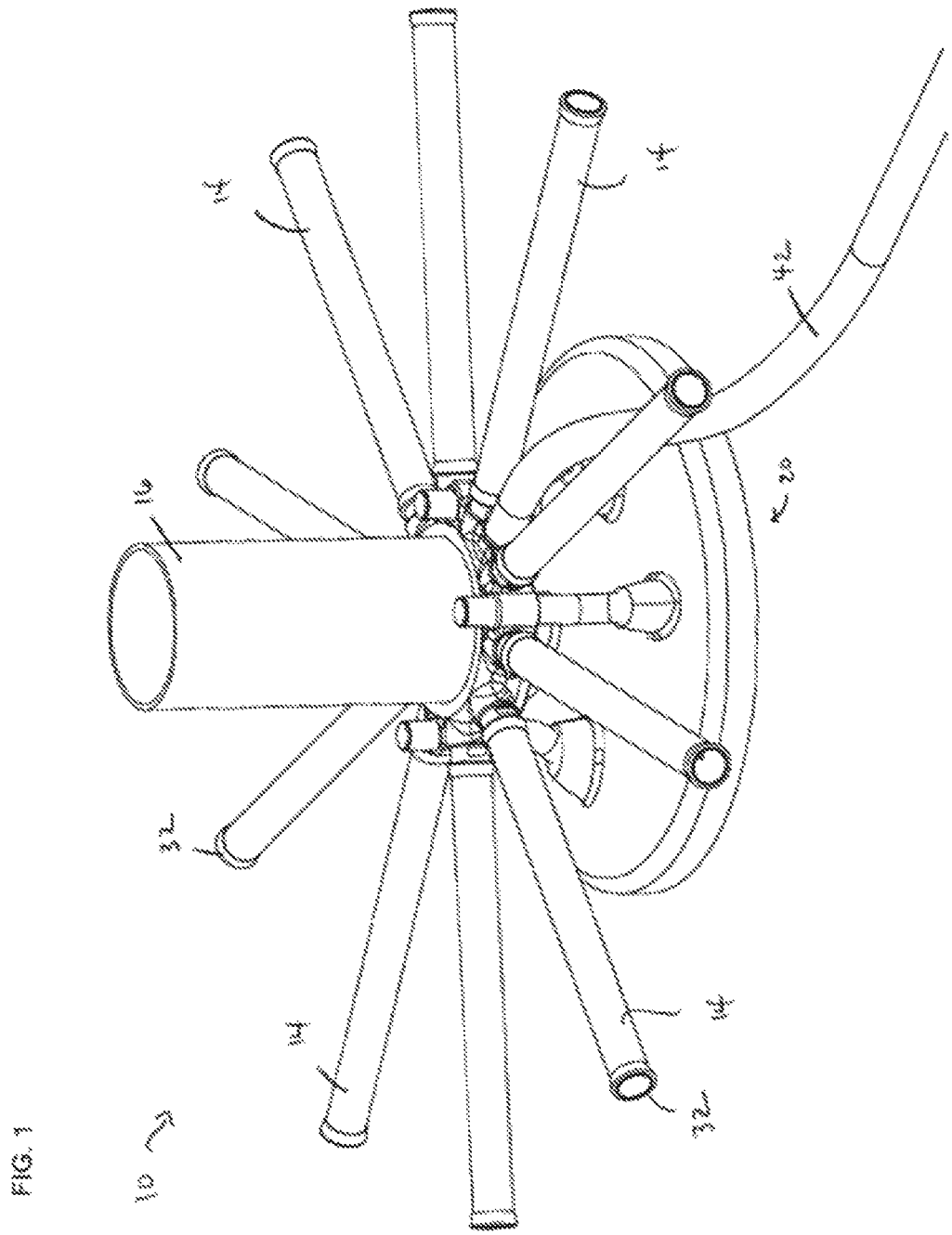
FIG. 1 is perspective view of one embodiment of an aerator in accordance with the invention.

A first exemplary embodiment of an aerator 10 in accordance with the invention is illustrated in FIGS. 1-7. In general, the embodiment 10 includes a ring-shaped hub 12, a number of fine-bubble-producing members 14 (e.g., ten) that extend outwardly from the hub 12; a central tube 16 that fits within a central aperture 18 formed in the hub 12 (see FIGS. 4B and 5 in particular); and a base assembly 20.

Figure 3:
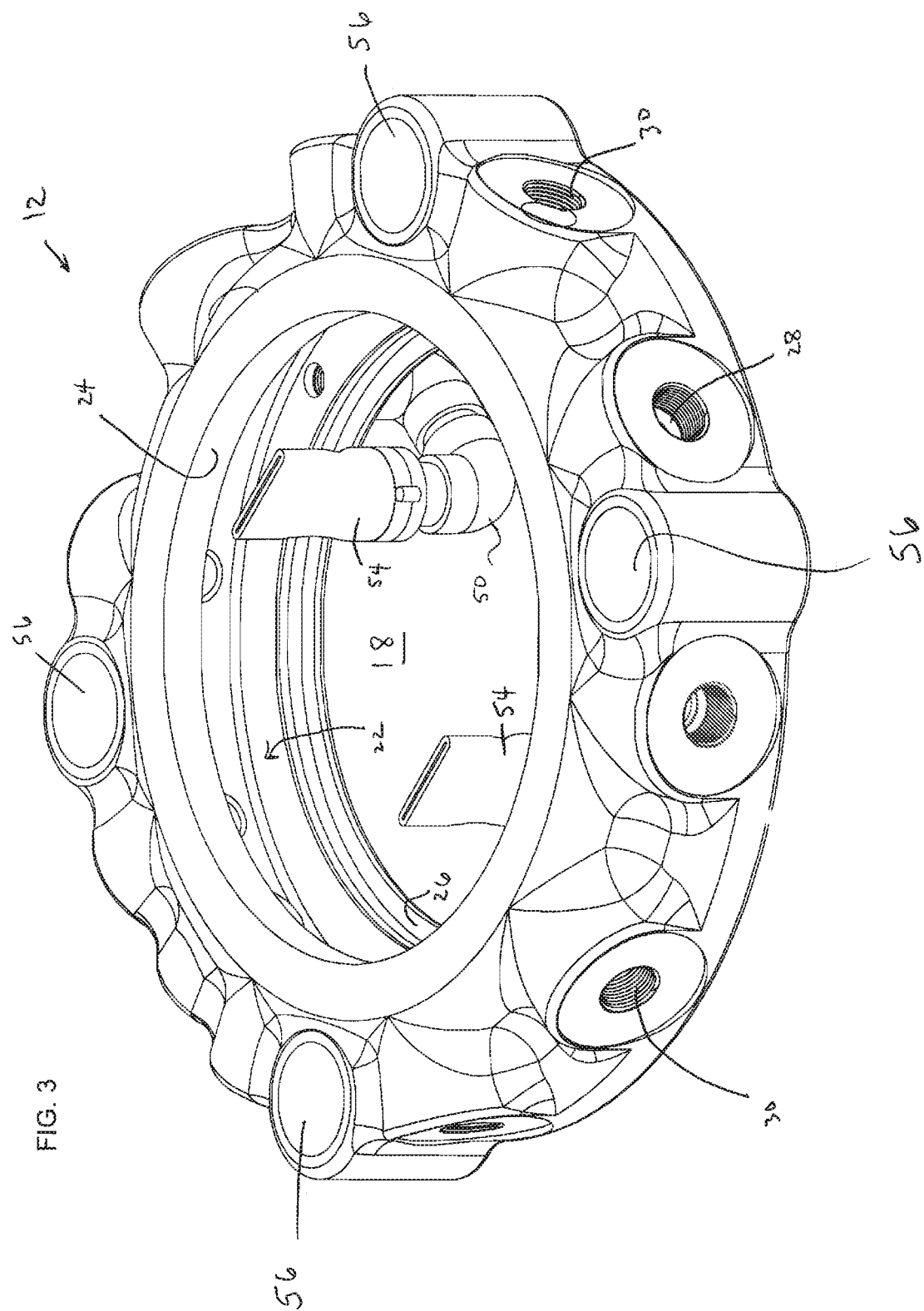
FIG. 3 is a perspective view of an aerator hub used in the aerator illustrated in FIGS. 1 and 2.
Figure 4:
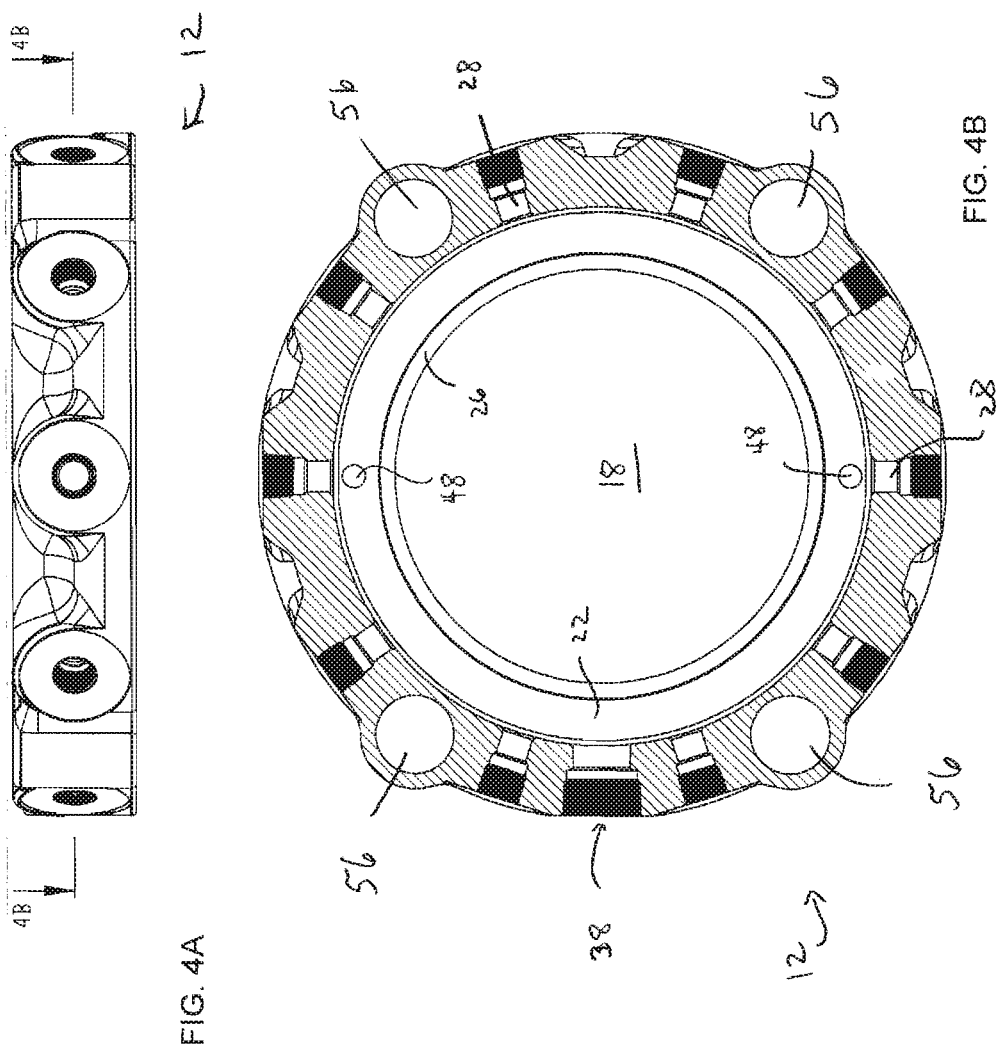
FIG. 4A is a side elevation view of the aerator hub shown in FIG. 3.
FIG. 4B is a section view taken along lines 4B-4B in FIG. 4A.

As best illustrated in FIGS. 3, 4A, and 4B, the hub 12 is suitably formed as a unitary member, ideally formed from plastic such as PVC. The hub 12 may be made starting from a solid blank, in which case fabrication could start by milling out the central aperture 18, or it may be made starting from a ring-shaped blank. An air chase 22 is cut into the wall 24 of the aperture (i.e., a radially inner portion of the hub 12) and extends circumferentially around the aperture 18. Additionally, a shoulder surface 26 is formed along what will be, in use, the lower side of the hub 12, also extending circumferentially around the aperture 18. Alternatively, the hub could be formed by molding, either in two halves that are then welded together or as one solid piece, and it could be formed from materials other than PVC.

As further illustrated in the figures, a number of ports or passageways 28 are formed extending radially through the hub 12 and are distributed circumferentially around the hub 12, with one port or passageway 28 being provided for each fine-bubble-producing member 14. The ports 28 open into the air chase 22 and allow air to pass out of the hub 12, from the air chase 22 and into the fine-bubble-producing members 14. Female threads 30 may be formed in the radially outer ends of the ports 28, and they constitute fittings by means of which the fine-bubble-producing members 14 are connected to the hub 12. Alternatively, male threaded nipples could be inserted into the ports 28, where the fine-bubble-producing members 14 can be connected.

Figure 2:
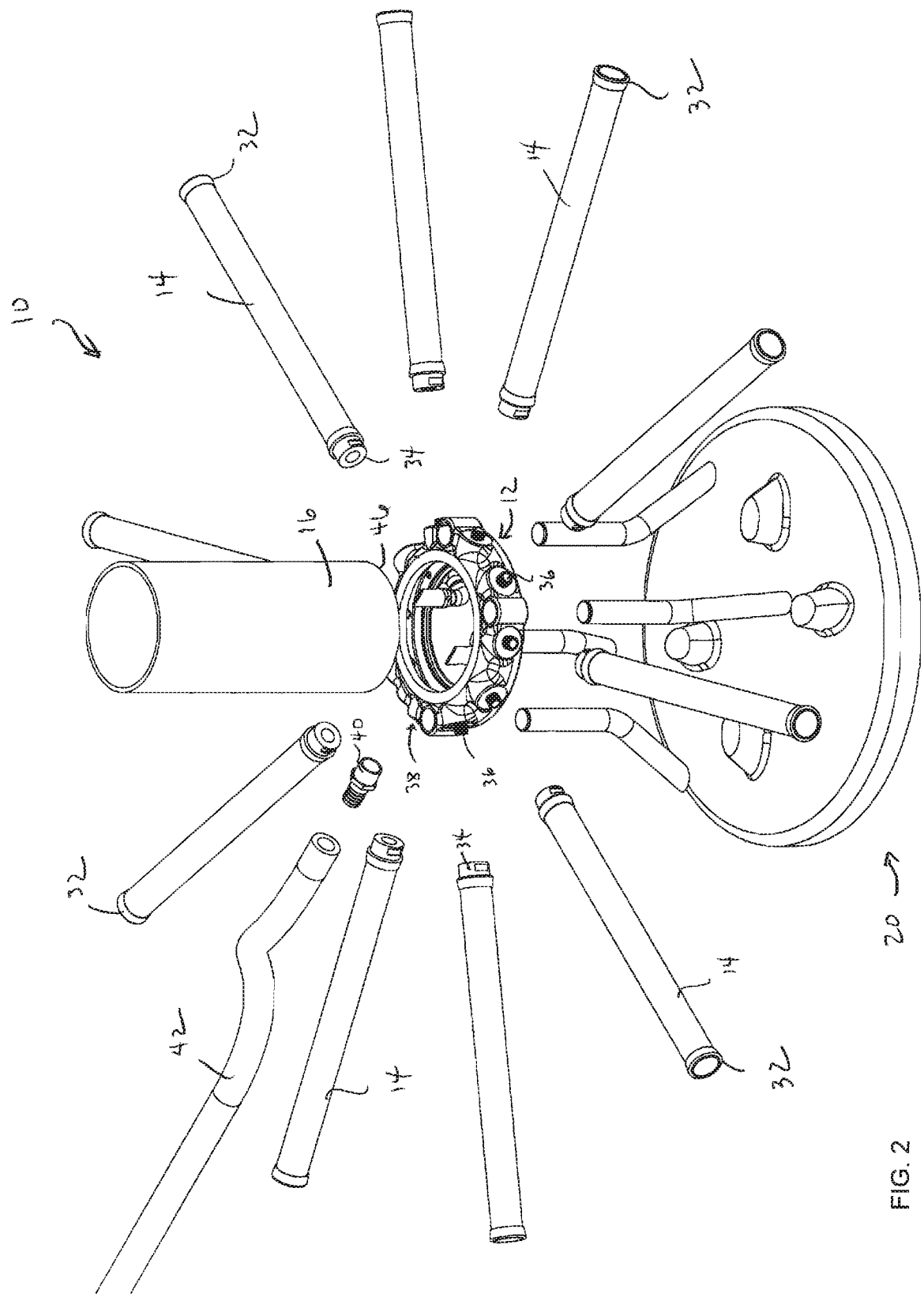
FIG. 2 is an exploded view of the aerator shown in FIG. 1.

Suitably, the fine-bubble-producing members 14 are tube diffusers, which are relatively well available in the wastewater treatment industry. As is known in the art, such diffusers often have a hollow core that is open to the environment at one end of the diffuser (i.e., the radial outer ends 32 of the fine-bubble-producing members 14), and a perforated, elastomeric membrane surrounding the core. Air is supplied to the diffuser through a female-threaded fitting 34 at the end of the diffuser that is opposite to the open end (i.e., the radially inner ends of the fine-bubble-producing members 34), which fitting 34 forces the air between the core and the membrane; the air then escapes through the perforations in the membrane in a fizzing manner. As shown in FIGS. 1 and 2, threaded nipples 36 are screwed into the female threads 30, or alternatively male threaded nipples are inserted into the radially outer ends of ports 28, and the fittings 34 at the radially inner ends of the fine-bubble-producing members 14 are screwed onto the threaded nipples 36 to engage with the ports 28, thereby establishing fluid communication between the air chase 22 and the fine-bubble-producing members 14.

Furthermore, an additional port or passageway 38 is also formed extending radially through the hub 12, and female threads are formed in the radially outer end of this port 38, too. A hose-barb adapter 40 (FIG. 1) is screwed into the port 38 and allows an air-supply hose 42 to be connected to the aerator 10 to provide air to the aerator. Because air flows out of the aerator 10 through several more exit points than points at which it enters the aerator, the port 38 is noticeably larger in diameter than the ports 28, to facilitate an adequate amount of air being introduced into the aerator 10.

As further illustrated in the figures (FIG. 5 in particular), the central tube 16—which is suitably made from a length of PVC pipe or other suitable material—fits within the aperture 18 in a manner such that the central tube 16 substantially closes off the air chase 22, thereby effectively making the air chase 22 internal to the hub. In particular, the outer diameter of the central tube 16 is essentially the same as the diameter of the aperture 18. Therefore, when the central tube is inserted into the aperture 18, the radially outer, external surface 44 of the central tube 16 bears against the walls 24 of the aperture 18 to essentially close off the air chase 22. (By essentially closing off the air chase 22, it is meant that the radially inner-facing side of the air chase is closed; the air chase 22 is not completely sealed given that air passes into it and out of it through the various inlet and outlet ports, as explained above and further below.) As illustrated, the central tube 16 is inserted into the aperture 18 until its end wall 46 butts up against the shoulder surface 26 extending around the aperture 18.

Figure 5:
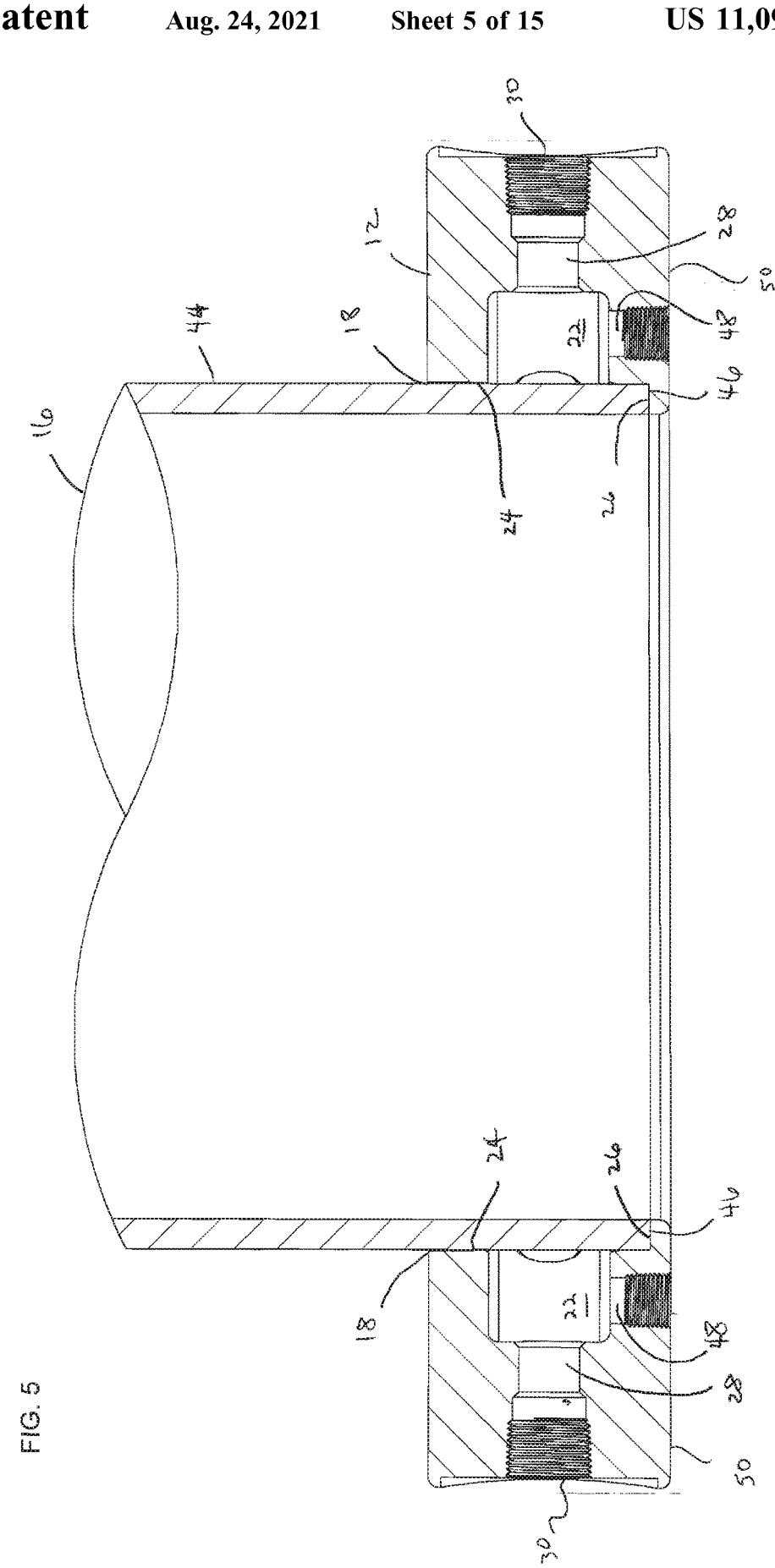
FIG. 5 is a section view illustrating the arrangement of a central tube within the aerator hub shown in FIGS. 3, 4A, and 4B.
Figure 6:
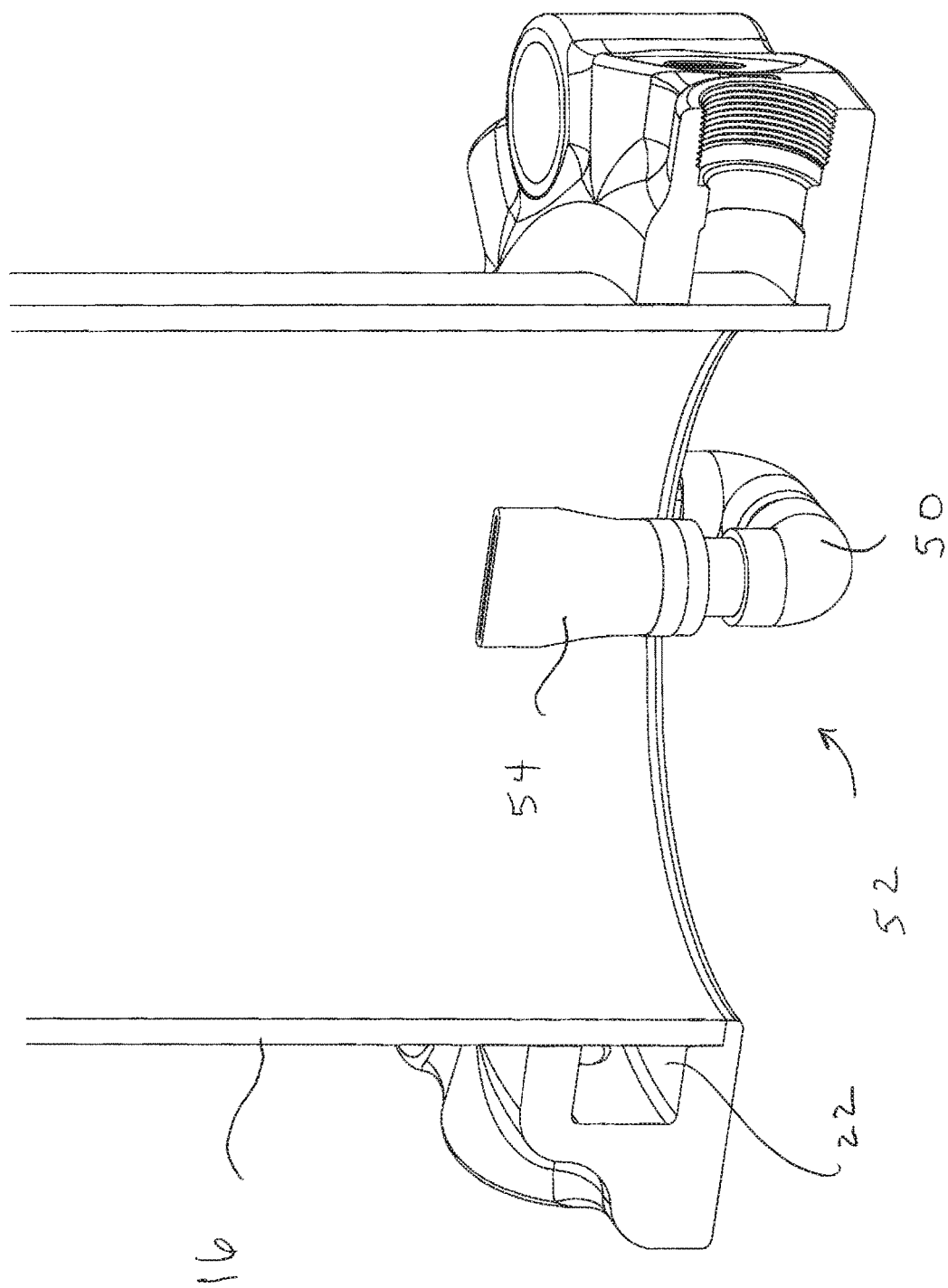
FIG. 6 is a cut-away view, with the aerator hub partially broken away, illustrating a wrap-under conduit used to provide air to the central tube shown in FIG. 5.

Two additional ports or passageways 48 are formed in the hub 12, extending from the air chase 22 to the lower, exterior surface of the hub as best shown in FIG. 5. The outermost ends of these ports 48 are threaded, like the ends of the ports 28 are. As shown in FIG. 6, a U-shaped wrap-under conduit 50 is screwed into the threaded end of each of the ports 48 and is configured to convey air downwardly from the air chase 22; beneath the end wall 48 of the central tube 16; and back up into the lower end 52 of the central tube 16, which lower end is open to the surrounding environment. Furthermore, a duckbill check-valve or similar device 54 is provided at the end of the wrap-under conduit to limit or prevent water from flowing back into the air chase 22 when air is not being provided to the aerator 10. Air from the air chase 22 that passes through the conduit 50 is released into the interior of the central tube 16 in the form of roiling bubbles; these bubbles, which are significantly larger than the bubbles fizzing out of the fine-bubble-producing members 14, cause water to flow up through the central tube 16 as the bubbles rise, thereby establishing circulation of water through and around the aerator 10.

In an alternative configuration (not illustrated), air could be ported directly into the lower end of the central tube 16 in a radially inward direction, i.e., without passing down and around the lower end of the central tube 16. In this case, apertures would be formed through the wall of the central tube 16, and air outlet fittings (e.g., 90° elbows to direct the air upwardly and duckbill check-valves) would be attached to these apertures, inside of the lower end of the central tube 16.

Figure 7:
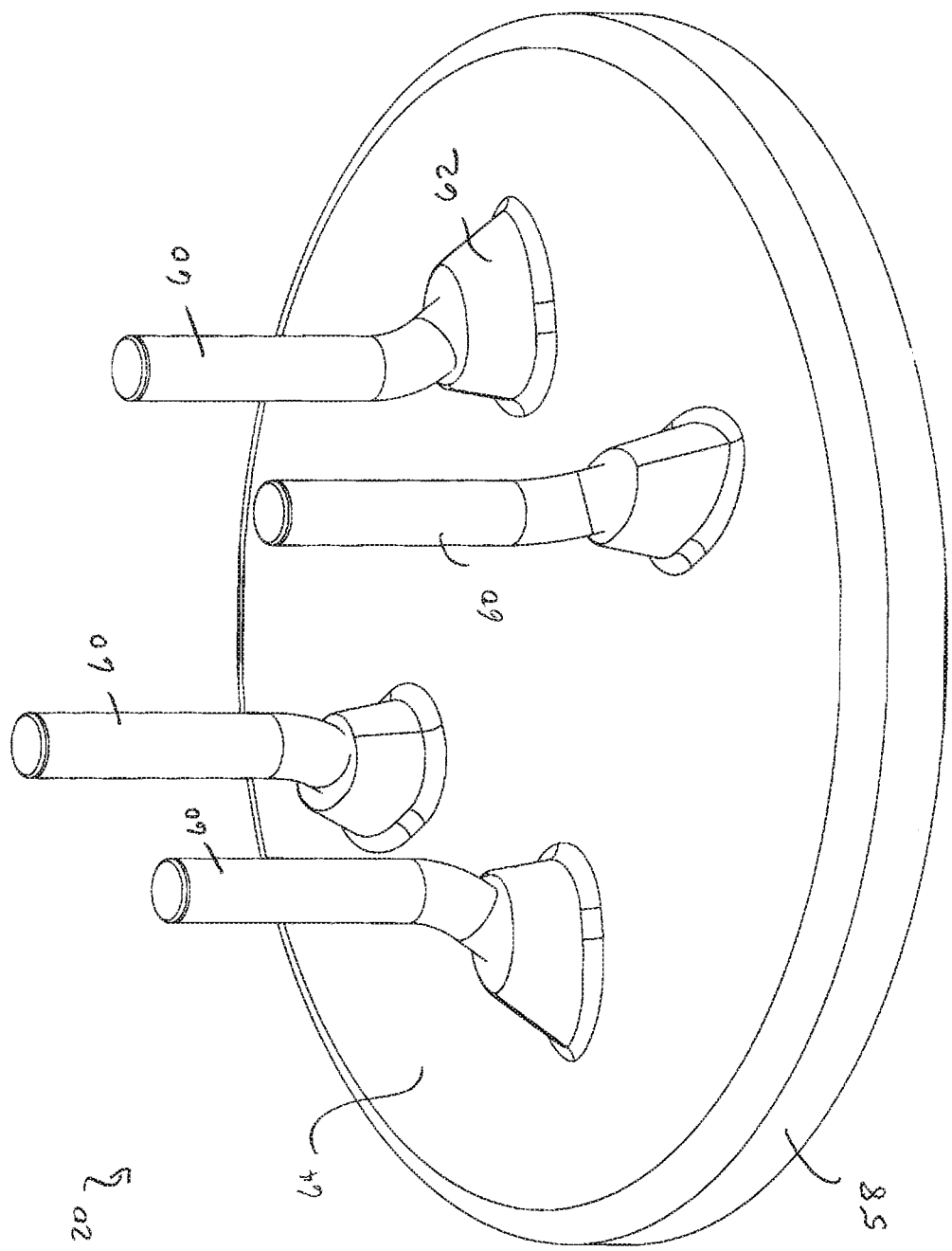
FIG. 7 is a perspective view of a base used in the aerator shown in FIGS. 1 and 2.

Finally with respect to this embodiment 10 of an aerator, in addition to the various ports 28, 38, and 48, the hub 12 also has several (e.g., four) leg apertures 56 that extend vertically through the radially outer portion of the hub 12. These apertures 56 are used to mount the hub 12 to the base assembly 20. As illustrated in FIG. 7, the base assembly 20 includes a generally disc-shaped base member 58 and several (e.g., four) legs 60 extending from the base member 58; the apertures 56 in the hub 12 fit over the legs 60 as shown in FIG. 1.

The base member 58 may be formed from concrete that has been poured into a tray, or it may be formed from plastic-coated metal. Whatever its construction, the base member 58 should be sufficiently heavy to sink the aerator assembly 10 and keep it submerged on the bottom of a treatment facility.

As further illustrated in FIG. 7, the legs 60 may extend from or be inserted into apertures (not shown) formed in base-member mounting standoffs 62, which protrude from the upper surface 64 of the base member 58. Additionally, the legs 60 may be "kinked" slightly, as illustrated in FIG. 7. In other words, the legs 60 may extend from the mounting standoffs 62 at an angle relative to the base member 58, and then bend so as to extend straight away from the base member. This configuration helps to keep the open lower end of the central tube 16 spaced from the base member 58, so that ample water can circulate up into the lower end of the central tube as the roiling bubbles rise within the central tube. Other configurations are, of course, possible. For example, spacer rings could be secured to the legs at desired locations to set the distance between the lower end of the central tube 16 and the base member 58.

Figure 12:
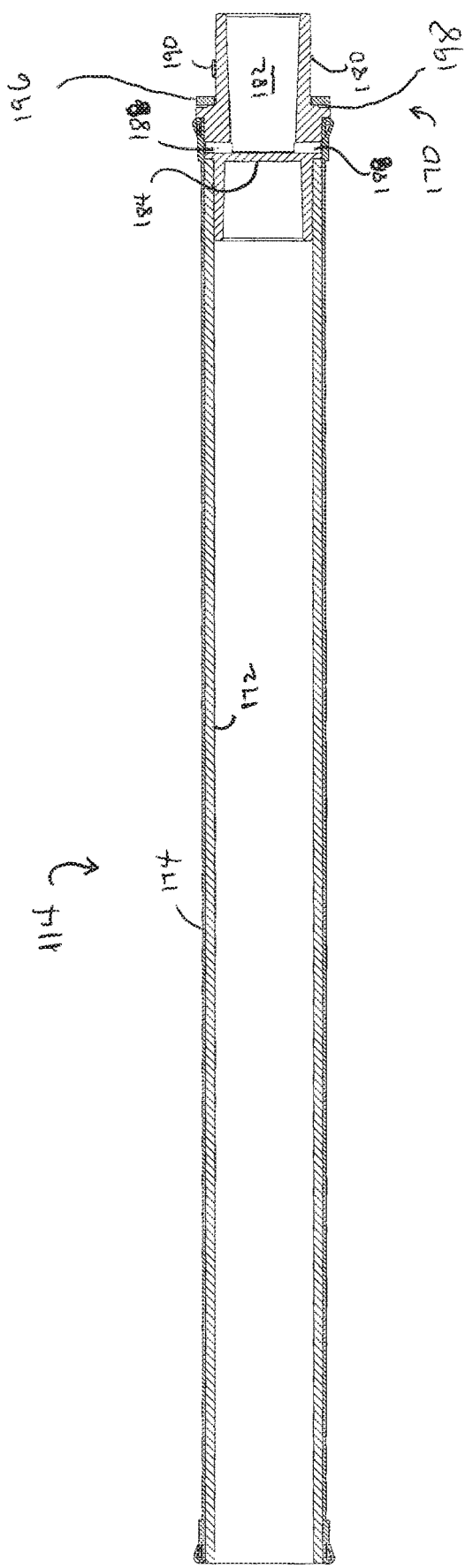
FIG. 12 is a section view of one of the fine-bubble-producing members used in the aerator illustrated in FIGS. 8 and 9.
Figure 13:
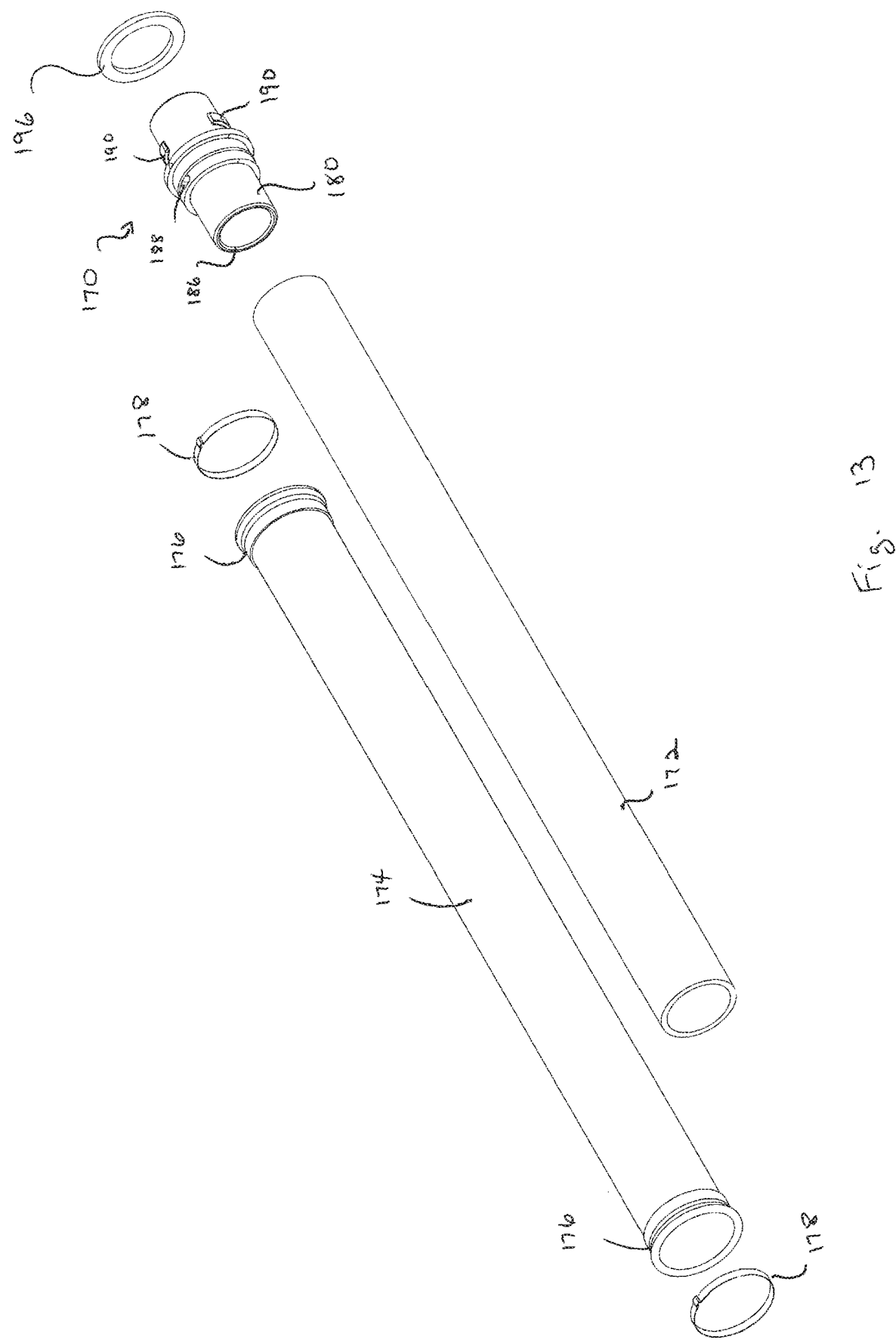
FIG. 13 is a perspective view showing components of the fine-bubble-producing member illustrated in FIG. 12.
Figure 14:
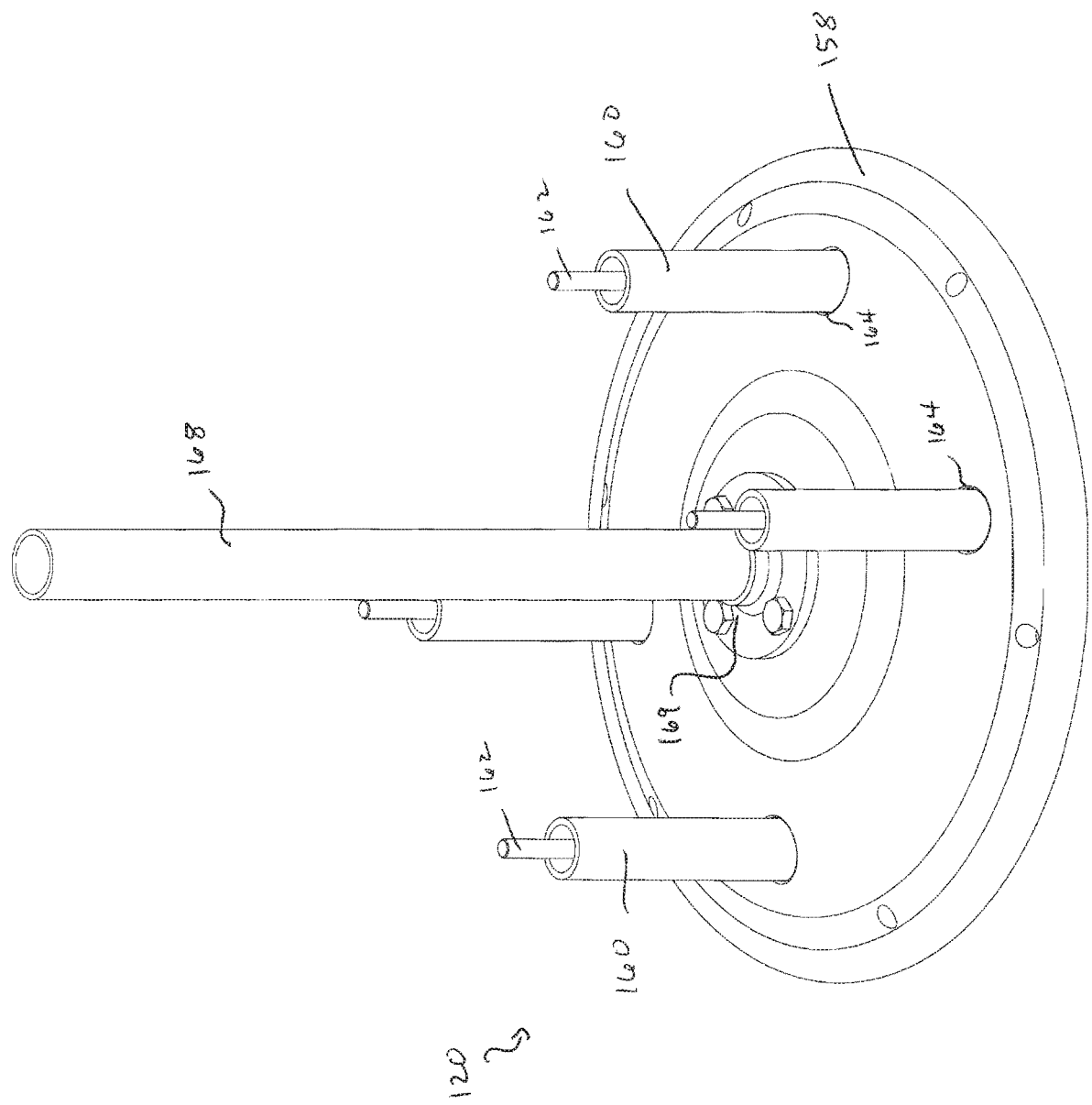
FIG. 14 is a perspective view showing components of the base assembly of the aerator illustrated in FIGS. 8 and 9.

A second exemplary embodiment of an aerator 100 according to the invention is illustrated in FIGS. 8-14. In general, like the first embodiment 10, the second embodiment 100 includes a ring-shaped hub 112, a number of fine-bubble-producing members 114 (e.g., ten) that extend outwardly from the hub 112; a central tube 116 that fits within a central aperture 118 formed in the hub 112 (see FIGS. 10 and 11B in particular); and a base assembly 120 (FIG. 14).

Suitably, the hub 112 may be made from glass-packed or glass-filled polypropylene. To facilitate creation of the slightly more complex configuration of the hub 112 as compared to the hub 12, the hub 112 may be molded in upper and lower halves 112a, 112b, which are then joined together along seam 112c, e.g., by friction welding, sonic welding, chemical means, adhesive, mechanical fastening, etc. An embedded air chase 122 is formed internally within the hub 112, extending circumferentially around the aperture 118. Additionally, a shoulder surface 126 is formed along the wall 127 of the aperture 118, extending circumferentially around the aperture 118, and provides a seating surface for the central tube 116. Because the air chase 122 is embedded within the interior of the hub 112, the exterior surface of the central tube 112 does not serve to seal off the air chase as is the case in the first embodiment 10 described above. Therefore, is not necessary to glue or solvent weld the central tube 116 to the shoulder surface 126, and it is acceptable for the central tube 116 simply to abut the shoulder surface 126.

As further illustrated in the figures, a number of ports or passageways 128 are formed extending radially within the hub 112 and are distributed circumferentially around the hub 112, with one port or passageway 128 being provided for each fine-bubble-producing member 114. The ports 128 open into the air chase 122 and allow air to pass out of the hub 112, from the air chase 122 and into the fine-bubble-producing members 114.

In this embodiment 100 of an aerator, the ports 128 and proximal ends 170 of the fine-bubble-producing members 114 are mutually configured to facilitate rapid assembly of the aerator using a "twist-lock" motion. In particular, as illustrated in FIGS. 12 and 13, each of the fine-bubble-producing members 114 includes a rigid hollow core 172 that is open at both ends and over which a perforated, elastomeric membrane 174 fits (perforations not shown). Suitably, the elastomeric membrane 174 includes a thickened reinforcing portion 176 at each end. Once the elastomeric membrane 174 has been positioned over the core 172, clamping rings 178 are fastened around the elastomeric membrane 174 at the reinforcing portions 176, and free ends of the elastomeric membrane 174 are folded back over the clamping rings 178 as is generally known in the art.

A molded plastic twist-lock fitting 180 fits partially within the distal end 170 of each fine-bubble-producing member 114, as best shown in FIG. 12. The twist-lock fitting 180 has an air-receiving conduit 182, which terminates at an interior wall 184 that spans across the area of the air-receiving conduit 182, and a spigot-fitting-type plug section 186 that is inserted into and secured within the open end of the core 172, e.g., by means of gluing, solvent welding, etc. One or more side conduits 188 extend radially through the wall of the twist-lock fitting 180 and allow air being pumped into the air-receiving conduit 182 to flow out of the twist-lock fitting 180 and in between the core 172 and the elastomeric membrane 174, to be released into the surrounding water column by diffusion through the perforations in the elastomeric membrane 174.

Figure 10:
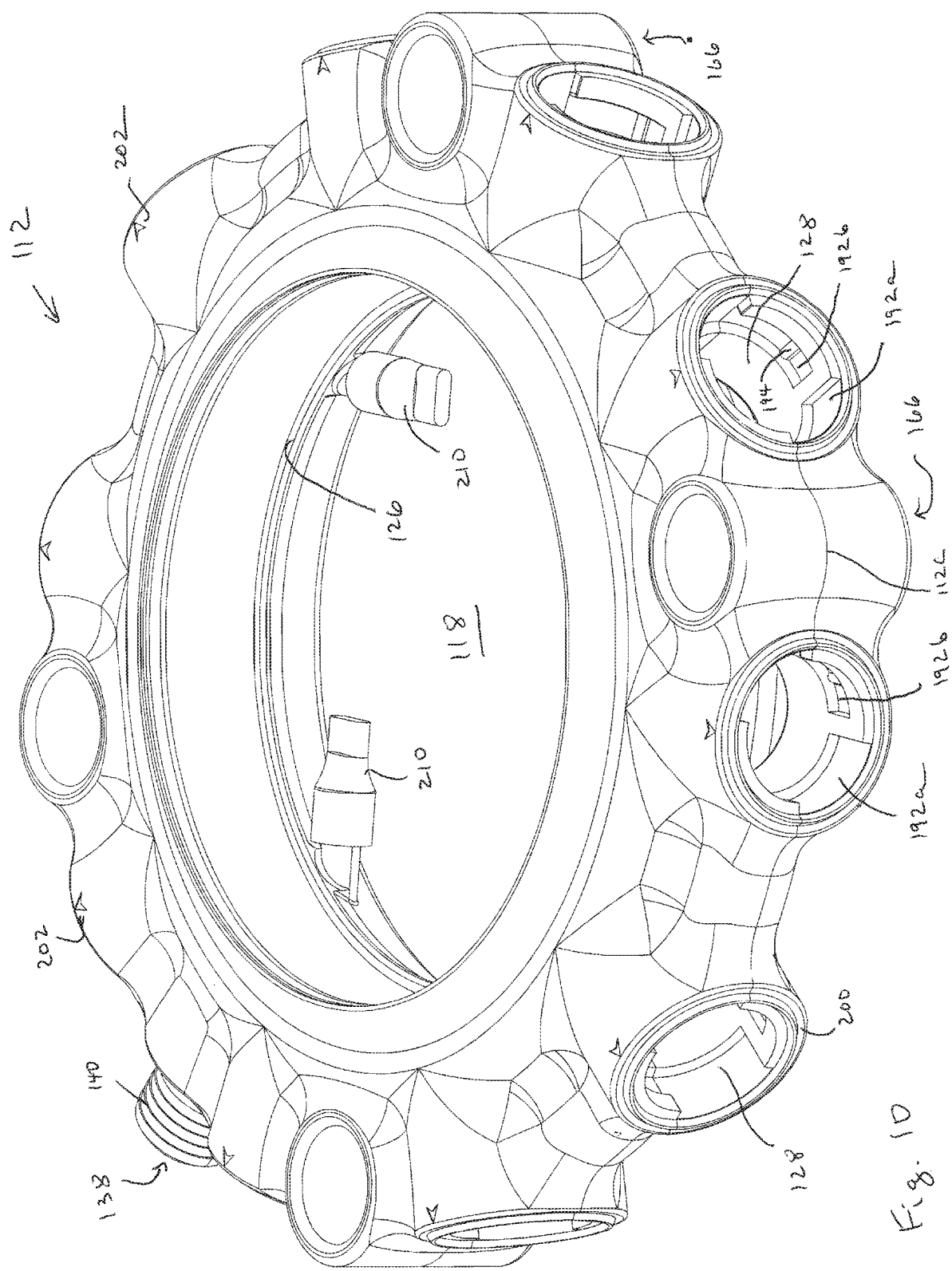
FIG. 10 is a perspective view of an aerator hub used in the aerator illustrated in FIGS. 8 and 9.
Figure 11B:
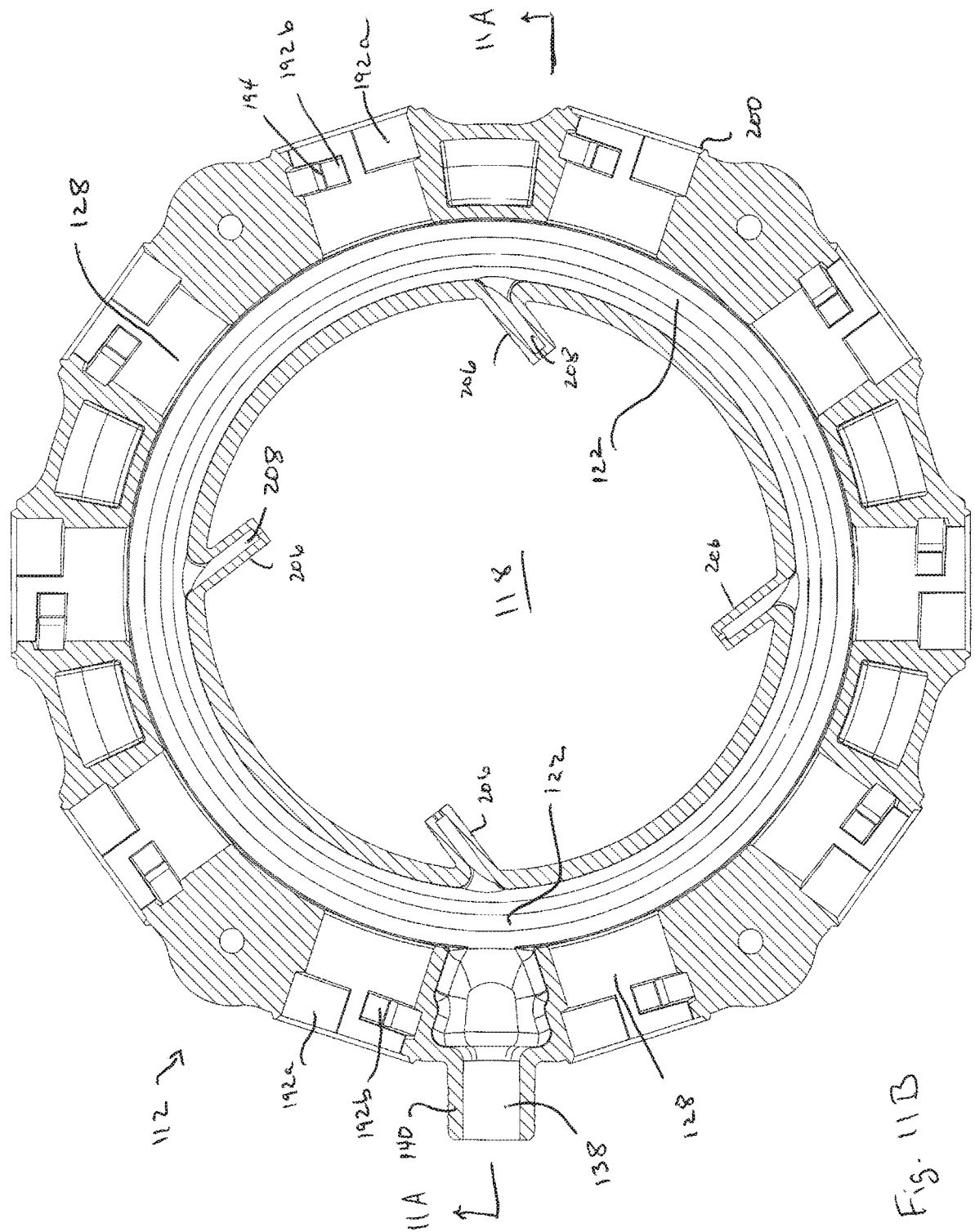
FIG. 11B is a section view of the aerator hub illustrating the aerator hub in plan view.

Furthermore, a pair of locking projections 190 extend outwardly from the wall of the twist-lock fitting 180 on either side of it, in the portion of the twist-lock fitting 180 through which the air-receiving conduit 182 is formed. On the other hand, corresponding locking slots are formed along the walls of the ports 128, as best shown in FIGS. 10 and 11B. The locking slots each include a pair of projection-receiving entry portions 192a that extend for a small distance in the radial direction of the hub 112, and a tail portion 192b extends from the radially innermost portion of each of the entry portions 192a. The tail portions 192b extend generally circumferentially around approximately one quarter of the circumference of the wall of the port 128, and the centerlines of the tail portions 192b may be inclined slightly (e.g., at one or two degrees) relative to the radial axes of the ports 128. A small locking rib 194 may also be provided within at least one of the tail portions 192b associated with each port 128, to help prevent the fine-bubble-producing member 114 from separating from the hub 112 after it has been attached to the hub 112.

With this configuration, a fine-bubble-producing member 114 is attached to the hub 112 by placing a washer-shaped elastomeric gasket 196 over the end of the twist-lock fitting 180 and positioning the elastomeric gasket 196 against a shoulder surface 198 surrounding the twist-lock fitting 180. (In an alternative configuration, not shown, the elastomeric gasket could be molded into the hub 112.) The locking projections 190 extending from the twist-lock fitting 180 are then aligned with and inserted into the projection-receiving entry portions 192a of the locking slots formed in the walls of a port 128, and the fine-bubble-producing member 114 is pressed radially inwardly until the elastomeric gasket 196 bears against a corresponding seating surface 200 on the hub 112 surrounding the port 128 (FIGS. 10 and 11B). Once the elastomeric gasket 196 contacts the seating surface 200, the fine-bubble-producing member 114 is rotated about its longitudinal axis, which causes the locking projections 190 to slide circumferentially along the tail portions 192b of the locking slots. If the centerlines of the tail portions 192b are inclined relative to the radial axis of the port 128, this rotation will cause the twist-lock fitting 180 to be drawn firmly against the seating surface 200 of the hub 112 to ensure a tight seal between the twist-lock fitting 180 and the hub 112.

Furthermore, as the fine-bubble-producing member 114 is rotated, the locking projections 190 will contact any locking ribs 194 that may be present within the tail portions 192b of the locking slots. Applying slight force will cause the locking projections 190 and/or the locking ribs 194 to deflect or deform slightly and allow the fine-bubble-producing member 114 to continue turning until the locking projections 190 reach the far ends of the tail portions 192b of the locking slots, at which point the locking rib or ribs 194 will help prevent the fine-bubble-producing member 114 from turning in the opposite direction and "backing out" of the port 128. Depending on the number of locking projections 190 and the number and lengths of the locking slots that are provided, the fine-bubble-producing members 114 will be completely seated within their ports 128 with just a portion of a complete rotation of the fine-bubble-producing member 114, e.g., a turn that is on the order of 90 to 180 degrees or less.

Suitably, indexing marks 202 are provided next to each of the ports 128, and when corresponding indexing marks (not shown) on the twist-lock fittings 180 line up with the indexing marks 202, the user will know that the fine-bubble-producing member 114 has been installed correctly, with the proper angular orientation. This is beneficial given that the elastomeric membranes used with such fine-bubble-producing members frequently have perforations only in certain select areas, and it is important for these select areas to be positioned correctly, e.g., on the top, bottom, or sides of the fine-bubble-producing member.

In the illustrated embodiment 100 of an aerator, the locking projections 190 extend from the twist-lock fitting 180 and the locking slots are formed in the walls of the ports 128. In an alternate embodiment (not illustrated), locking projections could extend from the walls of the ports 128 and locking slots could be formed along the exterior surface of the twist-lock fitting 180 to the same effect.

In addition to the ports 128, an air-supply port or passageway 138 is also formed extending radially through the hub 112 and into the air chase 122, with an externally barbed hose attachment nipple 140. The hose attachment nipple 140 allows an air-supply hose (not illustrated in connection with this embodiment 100) to be connected to the aerator 100 to provide air to it.

As further illustrated in FIGS. 10, 11A, and 11B, several integrally molded barbed nipples 206—e.g., four of them—extend radially inwardly from the wall of the aperture 118. Suitably, the barbed nipples 206 are evenly spaced around the aperture 118. Additionally, as illustrated, the barbed nipples 206 are suitably canted at an angle, e.g., 45 degrees, relative to the radial direction of the hub 112. The barbed nipples 206 are hollow, with air passageways 208 extending through them and communicating with the internal air chase 122 so that air supplied to the internal air chase 122 can flow through the barbed nipples 126 and into the center of the hub 112. Computational fluid dynamic analysis we have performed suggests that having four points of entry for air into the central tube 116 increases vorticity and sludge-mixing turbulence caused by the air that is injected by the barbed nipples 126.

An elastomeric duckbill check-valve or similar device 210 (FIGS. 9 and 10) is attached to the barbed end of each of the nipples 126 to limit or prevent water from flowing back into the air chase 122 when air is not being provided to the aerator 100. Air from the air chase 122 that passes through the nipples 126 is released into the interior of the central tube 116 in the form of roiling bubbles. These bubbles, which are significantly larger than the bubbles fizzing out of the fine-bubble-producing members 114, cause water to flow up through the central tube 116 as the bubbles rise, thereby establishing circulation of water through and around the aerator 100.

Figure 9:
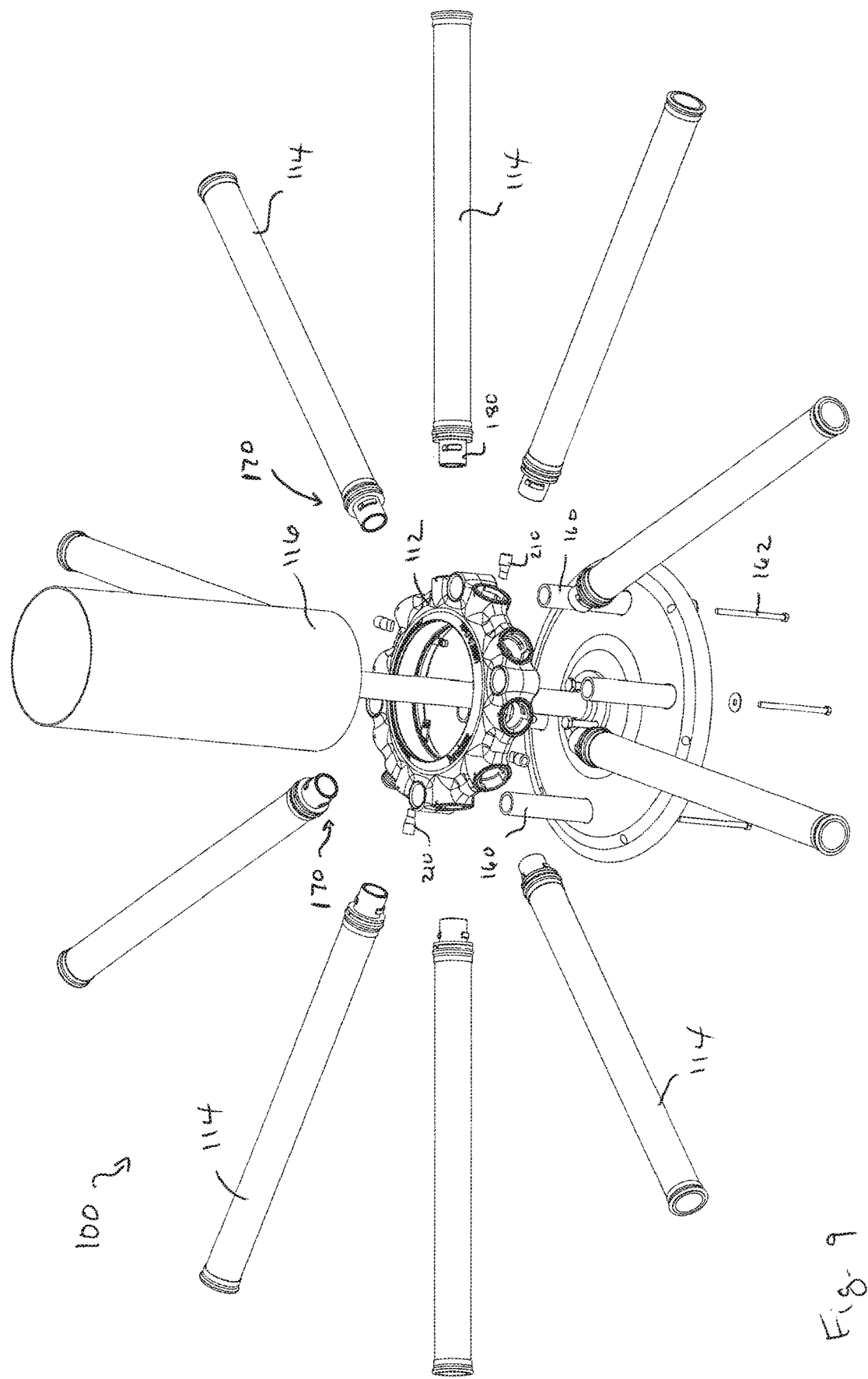
FIG. 9 is an exploded view of the aerator shown in FIG. 8.

Assembly of the aerator 100 is illustrated via FIGS. 9 and 14. As shown in FIG. 14, the base assembly 120 includes a generally disc-shaped base member 158, which is suitably made from steel, and several (e.g., four) legs 160 extending from the base member 158. (Using steel increases density of the unit and helps to keep the aerator submerged, even when the fine-bubble-producing members (namely, the spaces between the between the cores 172 and the elastomeric membranes 174) are filled with air.) As shown in FIG. 9, stainless steel threaded rods 162 (e.g., carriage bolts) pass upwardly through holes (not shown) that extend through the base member 158, and the legs 160, which are formed from stainless steel sleeves, fit down over the stainless steel threaded rods 162, as shown in FIG. 14. Lower ends of the legs 160 fit within "blind" pockets 164 that are formed in the top surface of the base member 158, and upper ends of the legs 160 fit within blind pockets 166 (FIG. 10) that are formed in the lower surface of the hub 112. The stainless steel threaded rods 162 are screwed into threaded sockets (not illustrated) located in the bottoms of the blind pockets 166, so that tightening the stainless steel threaded rods 162 pulls the hub 112 toward the base member 158 and "sandwiches" the legs 160 between the hub 112 and the base member 158.

The fine-bubble-producing members 114 are then attached to the hub 112 using a "twist-lock" motion, as described above, and an air-supply hose (not illustrated) is attached to the air-supply port or passageway 138.

Figure 8:
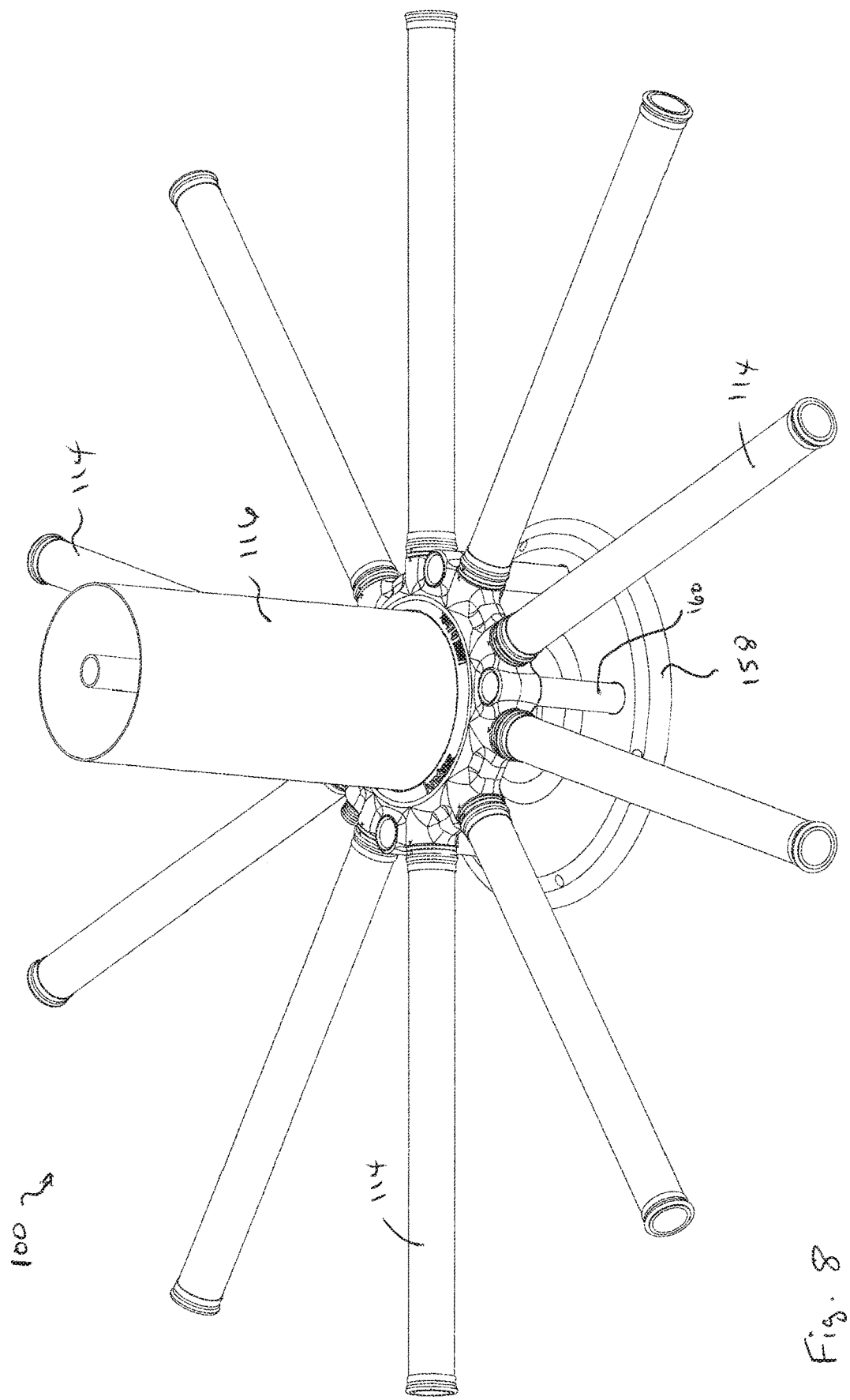
FIG. 8 is perspective view of a second embodiment of an aerator in accordance with the invention.

Furthermore, a stainless-steel deployment rod 168, which may be formed as a metal sleeve or a metal dowel that is threaded at its lower end, is screwed into a threaded pocket 169 formed in the upper surface of the base member 158, and the central tube 116 is inserted into the central aperture 118 of the hub 112 until it comes to rest against the shoulder surface 126, surrounding the deployment rod 168. As shown in FIG. 8, the upper end of the deployment rod 168 may be located generally at the same height as the upper end of the central tube 116, or it may be located slightly above or below the upper end of the central tube 116. A hook or loop of rope or metal cable (not illustrated), or other similar means, is attached to the upper end of the deployment rod 168 and is used to lower the aerator 100 into a body of water in which it is to be deployed, e.g., using rope or a cable. Because the deployment rod 168 is secured to the base member 158, which is made from steel, the user will be lifting and deploying the aerator 100 from the heaviest, sturdiest part of the assembly, which helps avoid damage to the unit.

Additionally, a common problem encountered in wastewater treatment lagoons is flushable wipes accumulating on the aerators. Because the deployment rod 168 extends upward, it limits the potential for such flushable wipes to accumulate on the aerator 100, and it gives them a location to accumulate—namely, at the top of the aerator 100 where it is tethered—that won't impede operation of the aerator.

It will be appreciated that the aerator embodiments 10 and 100 described above are merely illustrative examples, and various modifications to and departures from the disclosed embodiments will occur to those having skill in the art. What is deemed to be inventive is defined by the following claims.

We claim:

1. An aerator, comprising:
   a ring-shaped hub with a central aperture and an internal air chase that extends circumferentially around the central aperture;
   a plurality of discrete fine-bubble-producing diffusers extending outwardly from a radially outer surface of the hub and being in fluid communication with the air chase so as to receive from the air chase air to be released from the fine-bubble-producing diffusers in a fizzing manner;
   a central tube extending axially from the central aperture; and
   an air inlet arranged to provide air to the air chase, with the air chase arranged to distribute the air that has been provided to the air chase to both the fine-bubble-producing diffusers and the central tube.

2. The aerator of claim 1, wherein the hub is of unitary plastic construction,
   the air chase is formed as a groove extending circumferentially along a wall of the central aperture, and
   the central tube is positioned within the central aperture such that a radially outer, external surface of the central tube essentially closes off the groove,
   the central tube remaining in fluid communication with the air chase so as to receive from the air chase air that is to be released from the central tube in roiling bubbles.

3. The aerator of claim 2, further comprising an annular shoulder surface extending circumferentially around the central aperture, wherein the radially outer, external surface of the central tube engages with the wall of the central aperture and an end wall of the central tube engages with the annular shoulder surface.

4. The aerator of claim 3, wherein the end of the central tube having the end wall that engages with the annular shoulder surface is open, the aerator further comprising at least one U-shaped conduit that extends downwardly from the air chase and beneath the end wall of the central tube and that empties into the open, shoulder-surface-engaging end of the central tube.

5. The aerator of claim 4, wherein the U-shaped conduit terminates in a check valve disposed within the open, shoulder-surface-engaging end of the central tube.

6. The aerator of claim 1, wherein the hub is formed from upper and lower halves that are joined together.

7. The aerator of claim 6, wherein the air chase is embedded within the hub.

8. The aerator of claim 7, further comprising a plurality of tubes extending inwardly from a wall of the central aperture, with air passageways extending through the tubes and communicating with the air chase so that air supplied to the air chase can flow through the tubes, into the central aperture of the hub, and into a lower end of the central tube.

9. The aerator of claim 8, wherein each of the tubes terminates in a check valve.

10. The aerator of claim 1, wherein the fine-bubble-producing diffusers comprise tube diffusers extending radially outward from the hub.

11. The aerator of claim 1, wherein the fine-bubble-producing diffusers are attached to the hub by twist-lock connections requiring a turn along longitudinal axes of the fine-bubble-producing diffusers of approximately one quarter turn to secure the fine-bubble-producing diffusers to the hub.

12. The aerator of claim 11,
   wherein the hub includes a plurality of ports distributed around a radially outer surface thereof, with the ports being in fluid communication with the air chase;
   wherein each of the fine-bubble-producing diffusers includes a twist-lock fitting at an end thereof; and
   wherein the twist-lock fittings engage with the ports.

13. The aerator of claim 12, wherein one of a) each of the ports and b) each of the twist-lock fittings includes locking projections, and wherein the other of a) each of the ports and b) each of the twist-lock fittings includes locking slots,
   the locking slots each including 1) a projection-receiving entry portion extending in an axial direction of the diffuser on which the locking slot is formed, and 2) a tail portion that extends from an axially endmost portion of the entry portion in a circumferential direction of the diffuser on which the locking slot is formed.

14. The aerator of claim 1, further comprising a base assembly including a base member and a plurality of legs extending from the base member, wherein the legs engage with the hub and support the hub, the fine-bubble-producing diffusers, and the central tube at a distance from the base member.

15. The aerator of claim 14, wherein the base member is made from steel.

16. The aerator of claim 14, further comprising a deployment member extending vertically from the base member and extending within the central tube.

17. An aerator, comprising:
   a ring-shaped hub with a central aperture and an internal air chase that extends circumferentially around the central aperture;
   a plurality of discrete fine-bubble-producing members extending outwardly from a radially outer surface of the hub and being in fluid communication with the air chase so as to receive from the air chase air to be released from the fine-bubble-producing members in a fizzing manner;
   a central tube extending axially from the central aperture; and
   an air inlet arranged to provide air to the air chase, with the air chase arranged to distribute the air to both the fine-bubble-producing members and the central tube.

* * * * *